United States Patent [19]

Best et al.

[11] 4,003,426
[45] Jan. 18, 1977

[54] HEAT OR THERMAL ENERGY STORAGE STRUCTURE

[75] Inventors: John S. Best, Freeport; William J. McMillan, Midland, both of Mich.

[73] Assignee: The Dow Chemical Company, Midland, Mich.

[22] Filed: May 8, 1975

[21] Appl. No.: 575,558

[52] U.S. Cl. .............................. 165/53; 165/104 S; 252/67
[51] Int. Cl.$^2$ .................... F24D 5/10; F28D 13/00; C09K 5/00
[58] Field of Search ............ 165/104 S, 53; 252/67; 126/400

[56] References Cited
UNITED STATES PATENTS

| | | | |
|---|---|---|---|
| 3,191,392 | 6/1965 | Donnelly | 252/67 |
| 3,720,198 | 3/1973 | Laing et al. | 126/400 |
| 3,785,365 | 1/1974 | Laing et al. | 126/400 |

*Primary Examiner*—William L. Freeh
*Assistant Examiner*—G. P. LaPointe
*Attorney, Agent, or Firm*—Arthur J. Young

[57] ABSTRACT

A heat or thermal energy storage structure comprising a crosslinked polymeric resinous matrix having a plurality of substantially unconnected small closed cavities and a heat sink material encapsulated within the cavities. The structure is characterized in that the heat sink material forms an essentially stable dispersion in the uncured polymeric resinous matrix when mixed therewith before the matrix is crosslinked. The structure can beneficially be used in conjunction with low level heat or thermal energy collector means and heat transfer means to provide a space heating or cooling apparatus. The storage structure may also be effectively used to provide an additional function of a building component in a building construction such as a wall structure.

14 Claims, 1 Drawing Figure

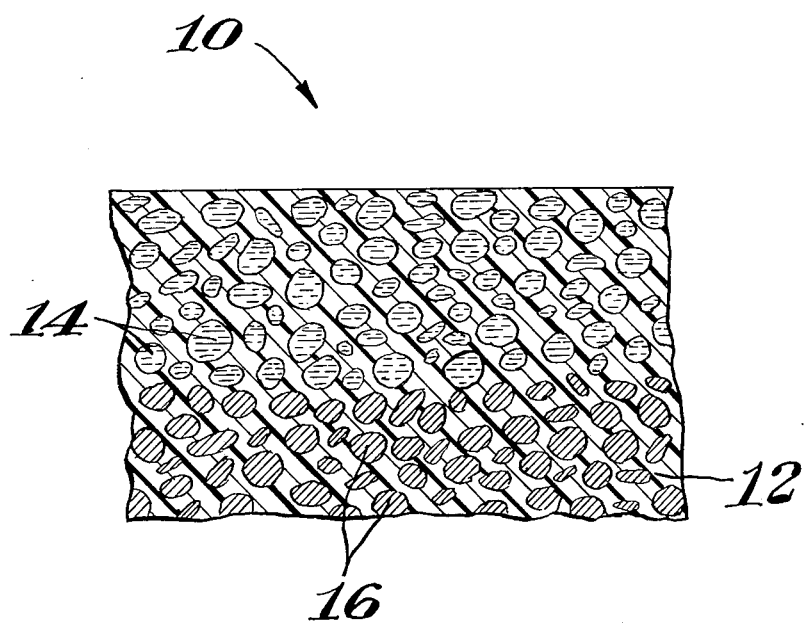

HEAT OR THERMAL ENERGY STORAGE STRUCTURE

BACKGROUND OF THE INVENTION

1. Field of the Invention

This invention relates to heat or thermal energy storage structures of the type serving as a heat reservoir from which heat may be drawn as needed for space heating or cooling, with particular reference to a heat or thermal energy storage structure formed by encapsulating a heat sink material in a cross-linked polymeric resinous matrix.

2. Description of the Prior Art

In general, the use of heat or thermal energy storage structures in space heating or cooling apparatus is well-known. Applications which have thus far occurred include storage of solar energy, storage of waste heat extracted during refrigeration or from waste process steam, and the like.

As commonly practiced, a heat or thermal energy storage reservoir consists of a well-insulated tank containing a fluid circulating coil on the interior thereof surrounded by a heat sink storage material. In addition, there are many known heat sink storage materials the use of which depends upon the service requirements to be met. Examples of known heat storage reservoirs and heat sink storage materials are well illustrated in U.S. Pat. Nos. 2,677,664; 2,706,716 and 3,834,456 and French Pat. No. 1,153,115.

SUMMARY

In general, the present invention provides a heat or thermal energy storage structure comprising a crosslinked polymeric resinous matrix having a plurality of substantially unconnected small closed cavities and a heat sink material encapsulated within the cavities. The storage structure is characterized in that the heat sink material forms an essentially stable dispersion in the uncured polymeric resinous matrix when mixed therewith before the matrix is crosslinked. Depending on the service requirements to be met, a heat sink material having a specific melting point can be selected to take advantage of the relatively large latent heat capacity at its melting and freezing phase change for supplying heat to or removing heat from the storage structure. Beneficially, the structure can be used in cooperation with low level heat or thermal energy collector means and heat transfer means to provide a space heating or cooling apparatus. When used in a space heating or cooling apparatus, the storage structure can also effectively provide a secondary function of a building component in a building construction such as at least one wall of a building.

Accordingly, this invention has among its objects the provision of a heat or thermal energy storage structure. Another object of this invention is the provision of a heat or thermal energy storage structure which in cooperation with low level heat or thermal energy collector means and heat transfer means can provide space heating or cooling apparatus. A further object of this invention is the provision of a heat or thermal energy storage structure which can effectively provide a secondary function as a building component of a building construction such as at least one wall in a building. Yet additional objects and advantages of the present invention are even more apparent when taken in conjunction with the accompanying specification and claims.

BRIEF DESCRIPTION OF THE DRAWING

Referring to the accompanying drawing, a magnified partial cross-sectional view of a crosslinked polymeric resinous matrix encapsulating a heat sink material formed according to the principles of the present invention is shown.

DETAILED DESCRIPTION OF THE INVENTION

The following description illustrates the manner in which the principles of the invention are applied but are not to be construed as limiting the scope of the invention.

Referring to the drawing, a heat or thermal energy storage structure 10 is illustrated. The storage structure 10 comprises a crosslinked polymeric resinous matrix 12 having a plurality of substantially unconnected small closed cavities encapsulating a heat sink material which may be in a liquid state, as shown by numeral 14, or in a solid state, as shown by numeral 16, after releasing its heat of fusion to the adjacent environment.

The heat or thermal energy storage structure which can be utilized in space heating or cooling apparatus can be formed with a matrix of any crosslinked or thermoset polymeric resinous material provided the heat sink material will form an essential stable dispersion in the uncured polymeric resinous matrix before the matrix is crosslinked. Particularly suited cross-linked polymeric resinous matrixes are selected from the group consisting essentially of polyesters, polyvinyl esters, and epoxies. Beneficially, the crosslinked polymeric resinous matrix comprises as low as about 25 weight percent but preferably 35 weight percent or more of the heat or thermal energy storage structure.

The heat sink materials useful in forming a heat or thermal energy storage structure should be selected to take advantage of their relatively large latent heat capacity at their melting and freezing phase change which supplies heat to or removes heat from the heat or thermal energy storage structure. The heat sink materials are characterized in that they should form an essentially stable dispersion in the uncured polymeric resinous matrix when mixed therewith before the matrix is crosslinked. Depending on the service requirements to be met, the heat sink materials forming the heat or thermal energy storage structure useful in space heating or cooling apparatus should beneficially melt between about 5° C and about 100° C and should not supercool more than about 5° C below the melt temperature of the heat sink material. The heat sink material can comprise up to about 75 weight percent and beneficially comprises up to about 65 weight percent of the heat or thermal energy storage structure.

A wide variety of heat sink materials may be employed in the heat or thermal energy storage structure in accordance with the present invention. Particularly suited as heat sink materials are inorganic hydrates such as barium hydroxide octohydrate, zinc nitrate hexahydrate, strontium bromide hexahydrate, calcium bromide hexahydrate, calcium chloride hexahydrate, ferric bromide hexahydrate and the like. Other inorganic hydrates which have poor supercooling characteristics such as sodium sulfate deccahydrate and calcium nitrate tetrahydrate can be used as heat sink materials provided they are nucleated as illustrated in U.S. Pat. Nos. 2,706,716 and 2,677,664. In addition, a wide variety of aqueous organic hydrate compositions can be used as heat sink materials such as those illustrated in U.S. Pat. No. 3,834,456, which patent is herein fully incorporated by reference. More specifically, examples of useful compositions found in the above patent are mixtures comprising one mole of tetrahydrofuran and 17 moles of water, one mole of pinacol and six moles of water, i.e., $(CH_3)_2COHCOH(CH_3)_2 \cdot 6\ H_2O$, and one mole of butane-2,3-diol and six moles of water.

To insure against long-term loss of the heat sink material from the heat or thermal energy storage structure, the structure may beneficially be enveloped in a gas or vapor barrier material. For example, after the heat or thermal energy storage structure has been formed it can be sealed in an envelope of metal foil such as aluminum foil or in a thermoplastic resinous barrier material. A wide variety of thermoplastic barrier materials may be employed in the envelope in accordance with the present invention. Particularly suited as gas or vapor barrier thermoplastic resinous materials are combinations of vinylidene chloride polymers, vinyl chloride polymers, vinylidene fluoride polymers and mixtures thereof. Particularly advantageous and beneficial are compositions of vinylidene chloride polymers, wherein the polymers contain at least 70 weight percent vinylidene chloride, the remainder being one or more olefinically unsaturated monomers copolymerizable therewith. Suitable vinylidene chloride polymers are prepared utilizing such comonomers as methyl, ethyl, isobutyl, butyl, octyl and 2-ethylhexyl acrylates and methacrylate; phenyl methacrylate, cyclohexyl methacrylate, p-cyclohexylphenyl methacrylate, chlorethyl methacrylate, 2-nitro-2-methylpropyl methacrylate, and the corresponding esters of acrylic acid, methyl alpha-chloro-acrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl maleate, dichlorovinylidene fluoride, dimethyl itaconate, diethyl itaconate, dibutyl itaconate, vinyl pyridine, maleic anhydride and allyl glycidyl ether. Commercially available light stabilizers may also be incorporated in the vinylidene chloride material such as tertiary-butyl salol. Other barrier compositions which may be used with benefit in accordance with the present invention are vinyl chloride polymers which contain a predominant amount of vinyl chloride therein, and beneficially, fluorocarbon polymers, fluoro-hydrocarbon polymers and fluorohalohydrocarbon polymers may also be used with benefit.

The invention is further illustrated by the following examples.

| EXAMPLE 1 | |
|---|---|
| Composition | Approximate Parts by Weight |
| Vinyl ester resin | 300 (25%) |
| Pinacol hexahydrate | 900 (75%) |
| Benzoyl peroxide | 0.88 |
| Dimethyl toluidine | 0.72 |

In forming the heat or thermal energy storage structure of the present example, the vinyl ester resin (available from The Dow Chemical Company under the tradename Derakane 470) and the pinacol hexahydrate (melting point at 45° C) were preheated to about 52° C. The benzoyl peroxide was then dissolved in the vinyl ester resin with vigorous agitation. Next, the pinacol hexahydrate was slowly added while continuing agitation to form an emulsion. Thereafter, the dimethyl toluidine was added while mixing to form the final composition which was then poured into a mold. The composition set up quickly in the mold (within about 5 minutes) and was removed after about 2 hours in the form of a rigid structure with the pinacol hexahydrate dispersed therein.

| EXAMPLE 2 | |
|---|---|
| Composition | Approximate Parts by Weight |
| Rigid polyester resin | 175 (17.5%) |
| Flexible polyester resin | 175 (17.5%) |
| Pinacol hexahydrate | 650 (65%) |
| Benzoyl peroxide | 2.6 |
| Dimethyl toluidine | 1.5 |

In forming the structure of this example, the rigid and flexible polyester resins (available from Interplastics Corp. under the tradename Corezyn 158-5 and LC 1062) and the pinacol hexahydrate were preheated to about 52° C as in Example 1. The mixing steps were accomplished in the same manner as in Example 1 with the final result being the formation of a resilient structure with pinacol hexahydrate dispersed therein.

| EXAMPLE 3 | |
|---|---|
| Composition | Approximate Parts by Weight |
| Vinyl ester resin | 750 (50%) |
| Anhydrous pinacol | 392 (50%) |
| Water | 358 |
| Benzoyl peroxide | 5.6 |
| Dimethyl toluidine | 2.25 |

In forming the structure of this example, the vinyl ester resin (available from The Dow Chemical Company under the tradename Derakane 411-45), the anhydrous pinacol and the water were preheated to about 52° C. The anhydrous pinacol and benzoyl peroxide were then dissolved in the vinyl ester resin with vigorous agitation. The water was then rapidly added with vigorous agitation continuing for a period of about 20 minutes to form an emulsion of pinacol hexahydrate in the resin. Thereafter, the dimethyl toluidine was added while mixing to form the final composition which was then poured into a mold. The composition set up quickly in the mold to form a rigid structure with the pinacol hexahydrate dispersed therein.

As previously discussed, the heat or thermal energy storage structure provided in accordance with the present invention is useful in forming an apparatus for space heating and cooling when combined with a low level heat or thermal energy collector means and heat or thermal energy transfer means. For example, when the utilization of solar energy for heating purposes is desired, the heat collector means comprises a radiant energy heat transfer device having at least one radiant energy transferring face adapted to absorb incident solar energy in the form of heat. In addition, the heat or thermal energy storage structure described herein is cast around a heat exchange circulating coil in any desired form such as a wall structure for a building and the heat transfer means is interconnected to the collector means, storage structure and a space the temperature of which is to be controlled whereby heat would be transferred from the collector means to the storage structure and to the space when the space is being heated and from the space to the storage structure and to an alfresco environment when the space is being cooled.

The application of the principles of the present invention can have a wide range of scope and are applicable to any use made of the heat or thermal energy storage structure herein described. While certain representative embodiments and details have been provided for the purpose of illustrating the invention, it will be apparent to those skilled in the art that various changes and modifications can be made therein without departing from the spirit and the scope of the invention.

What is claimed is:

1. A heat or thermal energy storage structure comprising a crosslinked polymeric resinous matrix having a plurality of substantially unconnected small closed cavities disposed therein and a heat sink material encapsulated within said cavities, said heat sink material having a relatively large latent heat capacity at its melting and freezing phase change which supplies heat to or removes heat from said storage structure.

2. The structure of claim 1 wherein said crosslinked polymeric resinous matrix is selected from the group consisting essentially of polyesters, polyvinyl esters and epoxies.

3. The structure of claim 1 wherein said heat sink material forms an essentially stable dispersion in the uncured polymeric resinous matrix when mixed therewith before said matrix is crosslinked.

4. The structure of claim 1 wherein said heat sink material has a melting and freezing phase change temperature of from about 5° C to about 100° C.

5. The structure of claim 1 wherein said heat sink material in the liquid phase supercools to less than about 5° C below its melting and freezing phase change temperature.

6. The structure of claim 1 wherein said structure is enveloped in a gas or vapor barrier material.

7. An apparatus for space heating or cooling comprising a low level heat or thermal energy collector means, a heat or thermal energy storage structure and heat or thermal energy transfer means, said storage structure comprising a crosslinked polymeric resinous matrix having a plurality of substantially unconnected small cavities disposed in said matrix with a heat sink material encapsulated within said cavities, said heat sink material having a relatively large latent heat capacity at its melting and freezing phase change which supplies heat to or removes heat from said storage structure, said transfer means interconnecting said collector means, storage structure and a space the temperature of which is to be controlled whereby heat is transferred from said collector means to said storage structure and to said space when said space is being heated and from said space to said storage structure and to an alfresco environment when said space is being cooled.

8. The apparatus of claim 7 wherein said crosslinked polymeric resinous matrix is selected from the group consisting essentially of polyesters, polyvinyl esters and epoxies.

9. The apparatus of claim 7 wherein said heat sink material forms an essentially stable dispersion in the uncured polymeric resinous matrix when mixed therewith before said matrix is crosslinked.

10. The apparatus of claim 7 wherein said heat sink material has a melting and freezing phase change temperature of from about 5° C to about 100° C.

11. The apparatus of claim 7 wherein said heat sink material in the liquid phase supercools to less than about 5° C below its melting and freezing phase change temperature.

12. The apparatus of claim 7 wherein said structure is enveloped in a gas or vapor barrier material.

13. The apparatus of claim 7 wherein said storage structure is a structural building component in a building construction.

14. The apparatus of claim 13 wherein said building component is at least one wall of a building.

* * * * *